United States Patent [19]

Hamb

[11] 3,816,122
[45] June 11, 1974

[54] FILM ELEMENT COMPRISING AROMATIC DIESTER CONTAINING COPOLYESTER SUPPORT
[75] Inventor: Frederick L. Hamb, Rochester, N.Y.
[73] Assignee: Eastman Kodak Company, Rochester, N.Y.
[22] Filed: June 25, 1973
[21] Appl. No.: 373,076

Related U.S. Application Data
[62] Division of Ser. No. 222,977, Feb. 2, 1972, Pat. No. 3,772,405.

[52] U.S. Cl. ................................. 96/87 R, 96/114.1
[51] Int. Cl. ......................... G03c 1/02, G03c 1/76
[58] Field of Search .......................... 96/87 R, 114.1

[56] References Cited
UNITED STATES PATENTS

| 3,433,770 | 3/1969 | Shima et al. | 260/75 |
| 3,511,809 | 5/1970 | Hogsed et al. | 260/47 C |
| 3,634,089 | 1/1972 | Hamb | 96/87 |
| 3,725,070 | 3/1973 | Hamb et al. | 96/87 |

Primary Examiner—William H. Short
Assistant Examiner—Edward Woodberry
Attorney, Agent, or Firm—Arthur H. Rosenstein

[57] ABSTRACT

A second polyester is prepared from a first polyester by a process comprising:
  A. mixing:
  1. a first polyester having the structure:

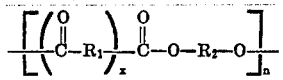

wherein $R_1$ is an aliphatic radical, an alicyclic radical or an aromatic radical, $R_2$ is an aliphatic radical or an alicyclic radical, $x$ is 0 or 1 and $n$ is a positive integer, 2. a dicarboxylic acid having the structure:

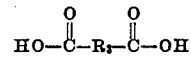

wherein $R_3$ is an aliphatic radical, an alicyclic radical or an aromatic radical, and
  3. an aromatic diester having the structure:

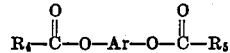

wherein $R_4$ and $R_5$ are radicals independently selected from the group consisting of alkyl radicals, cycloalkyl radicals, and aryl radicals and Ar is an arylene radical;

B. heating the mixture to form a melt; and
  C. removing the non-polymeric by-products of the reaction whereby the reaction equilibrium is driven in the direction of polymer formation and the second polyester is obtained; said second polyester is utilized as supports in photographic elements.

9 Claims, No Drawings

FILM ELEMENT COMPRISING AROMATIC DIESTER CONTAINING COPOLYESTER SUPPORT

BACKGROUND OF THE INVENTION

1. Field of the Invention

This invention relates to a process for the preparation of copolyesters. More particularly, this invention relates to the preparation of copolyesters from the interaction of a polyester, a dicarboxylic acid and an aromatic diester in a melt or melt-solid process. This invention also relates to the copolyesters obtained by said process.

2. Description of the Prior Art

Copolyesters containing aromatic, alicyclic and aliphatic glycol residues are known in the art and numerous patents have issued describing processes for preparing them. Generally, the most common processes described in the prior art for the preparation of such compositions are either (1) solution, as described, for example, in U.S. Pat. Nos. 3,426,100 and 3,498,950; (2) interfacial, as described, for example, in U.S. Pat. Nos. 3,278,640 and 3,471,441 and (3) diphenyl ester melt processes as described, for example, in U.S. Pat. No. 3,000,849 and by Schnell, *Angewandte Chemie*, Vol. 68, p. 633 (1956). The reaction of dialkyl esters with a mixture of aliphatic and aromatic glycols has not been found to be useful owing to the slow rate of exchange of the aromatic glycol.

The solution process requires the reaction of an acid chloride with aromatic and aliphatic glycols in the presence of an acceptor for the acid produced, as shown.

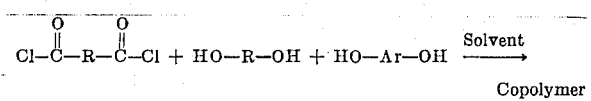

Such a process is disadvantageous because:

a. the use of the acid chloride necessitates its preparation from the corresponding acid using thionyl chloride (or other suitable reagent) which is an added, relatively expensive process, and b. the use of solvents and an acid acceptor adds considerably to the cost since they are recovered only with difficulty.

The interfacial process also requires use of the acid chloride and an acid acceptor in a two-phase system, as shown:

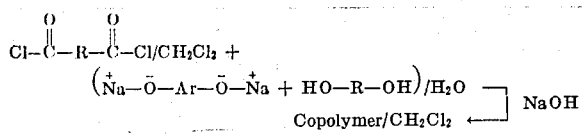

In addition to the disadvantages listed above for the solution process, the interfacial process also requires separation of the two phases and precipitation of the polymer into a non-solvent. Thus, from an economic and handling point of view, this process is even more costly than the solution process.

The diphenyl ester melt process uses glycols, as in the solution process, and the diphenyl ester of the acid, as below:

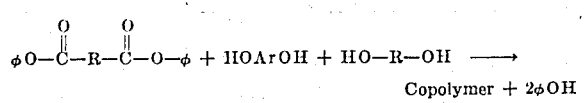

This process is a more convenient one than the two foregoing, but the need for preparing the diphenyl ester and handling the toxic phenol makes it somewhat less attractive than might otherwise be the case.

SUMMARY OF THE INVENTION

The present invention comprises a transesterification process in the melt phase whereby one or more dicarboxylic acids and one or more aromatic diesters are reacted with a known polyester to form a new polyester having a novel chemical structure and improved physical properties.

More particularly, the present invention comprises a process for preparing a second polyester from a first polyester, said process comprising:

A. mixing:

1. a first polyester having the structure:

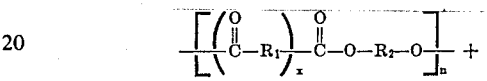

wherein $R_1$ is an aliphatic radical, an alicyclic radical or an aromatic radical, $R_2$ is an aliphatic radical or an alicyclic radical, $x$ is 0 or 1 and $n$ is a positive integer, 2. a dicarboxylic acid having the structure:

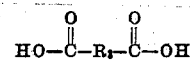

wherein $R_3$ is an aliphatic radical, an alicyclic radical or an aromtic radical, and 3. an aromatic diester having the structure:

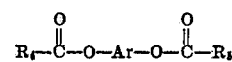

wherein $R_4$ and $R_5$ are radicals independently selected from the group consisting of alkyl radicals, cycloalkyl radicals, and aryl radicals and Ar is an arylene radical;

B. heating the mixture to form a melt; and

C. removing the non-polymeric by-products of the reaction whereby the reaction equilibrium is driven in the direction of polymer formation and said second polyester is obtained.

The product obtained by the foregoing process will be either an amorphous or a crystalline polymer. In the case where the polymer is an amorphous one, it will often be advantageous to crystallize the polymer by known technique and then to reheat the crystallized polymer under vacuum to increase the molecular weight.

This invention further comprises the products obtained by the processes described above.

DESCRIPTION OF THE PREFERRED EMBODIMENTS

The process of the present invention can be defined generally by the following equation:

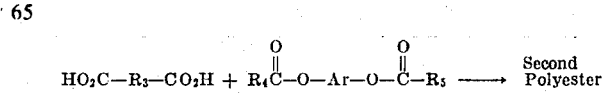

It will be noted that the term "polyester" as employed herein is to be interpreted as meaning "polymeric ester" and, as such, is intended to include the class of polymeric compounds generally referred to as polycarbonates, i.e., the polymeric starting material employed in the case where $x$ in the above equation is equal to zero.

$R_1$, when present, i.e., when $x$ is equal to 1, can be an aliphatic radical, an alicyclic radical, an aromatic radical or a combination thereof.

More specifically, $R_1$ can be a radical selected from the group consisting of unsubstituted or substituted alkylene radicals of from one to 10 carbon atoms, such as methylene ethylene, propylene, butylene, pentamethylene, hexamethylene, isomers thereof and the like; arylene radicals, such as o-, m-, or p-phenylene, naphthalenediyl, or anthracenediyl, unsubstituted or substituted with radicals such as halogen, nitro, cyano, alkyl of one to six carbon atoms or alkoxy of one to six carbon atoms; arylenebisalkylene radicals wherein the alkylene portion has one to six carbon atoms, such as phenylenedimethylene, phenylenediethylene, naphthalenediyldimethylene, naphthalenediyldiethylene and the like, cycloalkylene radicals, such as cyclopentylene, cyclohexylene, norbornanediyl; alkylenebisarylene radicals where the alkylene portion contains one to 12 carbon atoms, such as methylene, ethylene, trimethylene, hexamethylene, decamethylene, dodecamethylene, and the arylene portion is as defined above; alkylidenebisarylene radicals where the alkylidene portion contains one to 12 carbon atoms, such as ethylidene, allylidene, hexylidene and the like, and the arylene portion is as defined above; and arylenealkylene radicals where the arylene and alkylene portions are as defined above.

It is preferred that $R_1$ be an aromatic radical and particularly a phenylene radical. More preferably, $R_1$ is a meta-or para-phenylene radical, the para-phenylene being the most preferred.

$R_2$ is an aliphatic radical or an alicyclic radical, preferably one of from two to 10 carbon atoms which can be in either a linear or a branched configuration. As exemplary of those radicals which can be employed can be listed: ethylene, trimethylene, tetramethylene, pentamethylene, hexamethylene, heptamethylene, octamethylene, nonamethylene, decamethylene and the like as well as isomers of the foregoing such as, for example, 2-methyltrimethylene, propylene, 2-ethylhexamethylene and the like, cyclobutylene, cyclopentylene, cyclohexylene, etc., as well as substituted homologues thereof. It is preferred that $R_2$ be aliphatic and most preferred that it be ethylene. Accordingly, the most preferred polyester starting material to be employed in the practice of this invention is of the structure:

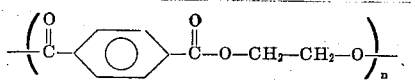

where $n$ is a positive integer.

The value of $n$ is not critical to the present invention, but in usual practice, it will generally be at least equal to about 10 and will not ordinarily be greater than about 750. For most purposes, a value for $n$ in the range of from about 10 to about 100 will be preferred.

$R_3$ can be either an aliphatic radical, an alicyclic radical or an aromatic radical and any radical suitable for use as $R_1$ is similarly suitable as $R_3$. It will be understood that in any given instance, $R_3$ can be, but is not necessarily, the same as $R_1$.

Accordingly, the dicarboxylic acids which may be employed to advantage in the practice of this invention include succinic acid, glutaric acid, adipic acid, pimelic acid, azelaic acid, thiodiglycolic acid, fumaric acid, cyclohexane-1, 3-dicarboxylic acid, cyclohexane-1,4-dicarboxylic acid, cyclopentane-1,3-dicarboxylic acid, 2,5-norbornanedicarboxylic acid, (the above-described acids being useful either as the cis or trans form), phthalic acid, isophthalic acid, terephthalic acid, tert.-butylisophthalic acid, phenylenedicacetic acid, phenylenedipropionic acid, 2,6-naphthalenedicarboxylic acid, 1,4-naphthalenedicarboxylic acid, 1,5-naphthalenedicarboxylic acid, 1,7-naphthalenedicarboxylic acid, 4,4'-diphenic acid, 4,4'-sulfonyldibenzoic acid, 4,4'-oxydibenzoic acid, binaphthyldicarboxylic acid, 4,4'-stilbenedicarboxylic acid and 9,10-triptycenedicarboxylic acid.

The preferred dicarboxylic acids to be employed in the practice of this invention are isophthalic acid and terephthalic acid. Terephthalic acid is most preferred.

Ar is an arylene radical and can be ortho-, meta-, or para-phenylene, substituted ortho-, meta-, or para-phenylene, substituted or unsubstituted diphenylene, substituted or unsubstituted condensed aromatics, other diphenylenes separated by aliphatic units (as derived from 4,4'-isopropylidene-diphenol, 7,7'-dihydroxy-4,4,4',4'-tetramethyl-2,2'-spirobi, 3,6-dihydroxy-9,9-dimethylxanthene, and 3,3,3',3'-tetramethyl-1,1'-spirobi-6,6'-diol), or in general Ar can be any type of substituted or unsubstituted aromatic group. Further, Ar can be those groups derived from any bisphenol of the structure:

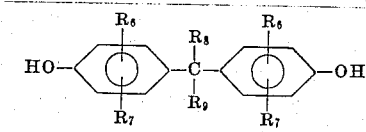

wherein each $R_6$ and $R_7$, which can be the same or different, is selected from the group consisting of hydrogen atoms, aryl radicals, such as phenyl, including substituted phenyl, halogen atoms, nitro radicals, cyano radicals, alkoxy radicals and the like, and wherein the substituents on the phenyl radical may be a halogen atom, nitro radical, amino radical, cyano radical, or alkoxy radical. $R_8$ and $R_9$ represent aliphatic monocyclic or bicyclic radicals or can each be hydrogen atoms, alkyl radicals of from one to six carbon atoms, including substituted alkyl radicals, such as fluoromethyl, difluoromethyl, trifluoromethyl, dichlorofluoromethyl, 2-ethyl and the like; cycloalkyl radicals of from four to six carbon atoms, such as cyclohexyl; and aromatic radicals having from six to 20 carbon atoms, such as phenyl, 3,4-dichlorophenyl, 2,4-dichlorophenyl, $R_8$ and $R_9$ taken together with the carbon atom to which they are attached can represent a monocyclic, polycyclic, or hetrocyclic moeity having from four to 15 atoms in the ring system.

Typical useful bisphenols include: Bisphenol A; 2,2-bis(4-hydroxy-3,5-dichlorophenyl)propane[tetrachlorobisphenol A]; 1-phenyl-1,1-bis(4hydroxyphenyl)ethane; 1-(3,4-dichlorophenyl)-1,1-bis(4-hydroxyphenyl)ethane; 2,2-bis(4-hydroxyphenyl)-4-[3-(2,3,4,5-tetrahydro-2,2-dimethyl-4-oxofuryl)]butane; bis-(4-hydroxyphenyl)methane; 2,4-dichlorophenylbis(4-hydroxyphenyl) methane; 1,1-bis(4-hydroxyphenyl)cyclohexane; 1,1,1,3,3,3-hexafluoro- 2,2-bis(4-hydroxyphenyl)propane; diphenylbis(4-hydroxyphenyl)methane.

Other useful bisphenols include 1,4-naphthalenediol, 2,5-naphthalenediol, bis(4-hydroxy-2-methyl-3-propylphenyl)methane, 1,1-bis(2-ethyl-4-hydroxy-5-sec.-butylphenyl)ethane, 2,2-bis(4-hydroxyphenyl)propane, 2,2-bis(4-hydroxy-2-methyl-5-tert.-butylphenyl)propane, 1,1-bis(4-hydroxy-2-methyl-5-isooctylphenyl)isobutane, bis-(2-ethyl-4-hydroxyphenyl)-4,4-di-p-tolymethane. Still other useful bisphenols are disclosed in U.S. Pat. No. 3,030,335 and Canadian Pat. No. 576,491.

As stated above, $R_4$ and $R_5$ are radicals which are independently selected from the group consisting of alkyl radicals, cycloalkyl radicals, aryl radicals and mixtures thereof, e.g., aralkyl, alkaryl and the like. As exemplary of those radicals which can be employed can be listed: methyl, ethyl, propyl, isopropyl, butyl, isobutyl, tert.-butyl, sec.-butyl, pentyl, 2-ethylbutyl, 2-ethylhexyl, phenyl, substituted phenyl, e.g., tolyl, xylyl, o-ethylphenyl, m-ethyl phenyl, o-chlorophenyl, m-chlorophenyl, p-chlorophenyl, 2-methoxyphenyl, 4-ethoxyphenyl, cyclopentyl, cyclohexyl, naphthyl and the like.

The preferred diester for use in the practice of this invention is Bisphenol A diacetate, i.e.

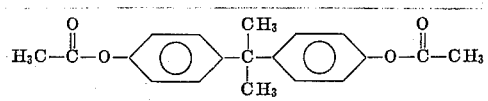

Although the mechanism of the process of this invention is not fully understood and no limitations should be imposed upon the scope of this invention by theoretical considerations, it is believed that the initial step in the process is an acidolysis of the starting polyester to yield shorter chains ending in carboxylic acid groups. These shorter chains can then react with the aromatic diester, e.g., Bisphenol A diacetate, and propagation, i.e., polymerization, can begin as the second step of the process. Accordingly, it is believed that the intermediate product is a block copolymer containing units of the starting polyester and units of a second polyester derived from the dicarboxylic acid starting material and the aromatic diester starting material. It is further believed that simultaneously with this, there is probably formed a certain amount of homopolyester derived from the dicarboxylic acid starting material and the aromatic diester starting material. Additionally, ester interchange between the starting polyester and the starting aromatic diester may occur, thereby yielding shorter chains ending in the latter unit from which polymerization could proceed.

The final step in the process then is believed to be an equilibration of the initially formed polymeric species giving, as a final product, copolyesters having individual units arranged in a statistically random distribution. Thus, the process of this invention may be referred to as an acidolysis/polymerization/equilibration process.

From the foregoing, it will be apparent to those skilled in the art that polymers can be prepared having the same gross, or overall, chemical composition but having significantly different compositions from one polymer chain to another. This phenomenon is referred to herein as chemical compositional heterogeneity. Owing to this chemical compositional heterogeneity, polyesters having the same gross chemical composition can be caused to have variations in physical properties, e.g., glass transition temperature, melting temperature, solubility, percent crystallinity and the like. Further, the polyesters prepared by the process of this invention can be shown to have properties differing from polyesters of the same gross chemical compositions prepared by prior art processes.

As is generally the case with condensation polymerization reactions, the present reaction includes the splitting-out of simple molecules, such as, for example, water, alcohols, e.g., methanol, ethanol and the like; low molecular weight monocarboxylic acids, e.g., acetic acid, propionic acid, and the like. In order to drive the reaction equilibrium in the direction of polymer formation, it is necessary that these by-products be removed. Means by which such removal can be effected will be apparent to those skilled in the art and include such procedures as distillation, preferably under vacuum, or bubbling nitrogen or other inert gas through the polymer melt or through the hot solid, for example, by fluidized bed techniques. Vacuum distillation is a particularly convenient technique for the practice of this invention and is preferred.

The compositions prepared by the process of this invention are useful for the formulation of films, either cast or extruded, which are flexible and tough and find utility in many applications, for example, as photographic and non-photographic supports, as coatings, and as adhesives. Other applications include organic solvent applied undercoats for photographic products and fibers for many consumer products, particularly tire cord. Other uses include their application in injection molding, as engineering plastics, as high temperature molding and sheeting and as electric motor insulation.

The molecular weight of the polyester prepared by the process of this invention can vary over wide ranges; it has been found that polymers having a molecular weight of at least about 3,000 are useful. Compounds having a molecular weight from about 10,000 to 100,000 are particularly desirable. The compounds of this invention are further characterized by their inherent viscosities. Generally, the subject film-forming polymers have an inherent viscosity of about 0.1 to about 1.5 and the polymers preferred as supports for photographic elements have an inherent viscosity of about 0.5 to about 1.3. The inherent viscosities are measured at 25°C in 1:1 (by weight) phenol:chlorobenzene at a concentration of 0.25g of polymer per 100 ml. of solution unless otherwise specified.

The glass transition temperatures of the polymers of this invention can be determined by differential scanning calorimetry as disclosed in "The DSC Cell and Accessories Instruction Manual for the 900 Thermal Analyzer and Modules," sold by E. I. DuPont deNemours Instrument Products Division.

"Film-forming" as used in this invention refers to a material which will provide a self-supporting film of the material when cast or extruded, for example, when cast in sheets of from 1 to 7 mils thickness.

According to the present invention, polyesters are prepared by either a melt process or a melt-solid process. As defined herein, the melt process and the melt-solid process are the same except that the melt-solid process comprises the steps of crystallization, and reheating in addition to the steps employed in the melt process, i.e., selecting the first polyester, mixing therewith a dicarboxylic acid and an aromatic diester, heating to form a melt and removing by-products by vacuum distillation. Where it is employed, the solvent crystallization procedure generally involves contacting melt process polymer with a solvent at ambient temperatures. Suitable solvents include acetone, 2-pentanone, ethyl acetate, acetic acid, toluene and the like. The treated material is separated from the solvent by any conventional procedure. The melt process is advantageously conducted in the presence of a catalytic agent. Useful catalysts for the transesterification reactions include the carbonate, oxide hydroxide, hydride and alkoxide of an alkali metal or an alkaline earth metal, a compound of a Group IVA metal of the Periodic Table, e.g., dibutyltin oxide, titanium isopropoxide, organometallic halides and complex alkoxides such as $NaHTi(OC_4H_9)_2$ and the like.

The following examples are included for a further understanding of the invention.

EXAMPLE 1

Preparation of Poly(Ethylene:4,4'-Isopropylidenediphenylene Terephthalate 50:50

A. Prepolymer

Into a 50 milliliter long-necked polymer flask are added the following:
5.76 grams poly(ethylene terephthalate) (inherent viscosity 0.70)
4.98 grams (0.03 mole) terephthalic acid
9.37 grams (0.03 mole) of Bisphenol A diacetate
0.005 gram dibutyltin oxide
The flask is inserted in a bath at 280°C and, while stirring, nitrogen is passed over the mixture. After 3 hours the mixture is a clear, homogeneous melt whereupon a vacuum of 0.05 millimeter is applied. After 1 hour under vacuum the melt is extremely thick and the vacuum is released. The polymer is isolated as an amorphous glass with an inherent viscosity of 0.30.

B. Crystallization

The polymer prepared in A is ground and placed in 10 times its weight of acetone. After standing overnight the solid is filtered and dried in an oven at 130°C. The crystallized solid has a melting range of 158°–276°C. The inherent viscosity of the crystallized material is 0.31.

C. Powder Build-up

The crystallized solid from B is placed in a test tube. While maintaining a vacuum of 0.1 millimeter the tube is placed in a bath at 190°–200°C. After 72 hours the solid has an inherent viscosity of 0.93.

D. Properties of The Final Polymer from Example C.

Inherent viscosity = 0.93
$T_g$ = 146°C
$T_m$ = 272°C
$T_m$ range = 238–292°C

The polymer can be crystallized by solvent treatment or can be obtained in the amorphous phase by quenching. It is comprised of 54 percent of the 4,4'-isopropylidenediphenylene unit and is insoluble in acetone, yet readily soluble in chlorinated hydrocarbons. The composition as prepared in this example is a homogeneous copolymer wherein the units are randomized with respect to their locality along the polymer chain.

EXAMPLE 2

Preparation of Poly(Ethylene:4,4'-Isopropylidenediphenylene Terephthalate 90:10)

A. Prepolymer

This polymer is prepared in the same manner as that of Example 1, using the following quantities:
10.37 grams poly(ethylene terephthalate)
1.0 gram (0.006 mole) terephthalic acid
1.87 grams (0.006 mole) Bisphenol A diacetate
0.005 gram of dibutyltin oxide
After an hour and a half, a vacuum of 0.1 mm is applied to the homogeneous melt with stirring. The vacuum is maintained for 1 hour and then released. The polymer is isolated as an amorphous glass with an inherent viscosity of 0.32.

B. Crystallization

The polymer from A is heated at 155°C for 6 hours. This serves to crystallize the polymer to its greatest extent.

C. Powder Build-up

The crystallized solid is placed in a test tube and, while maintaining a vacuum of 0.1 millimeter, is heated at 200°–210°C for 4 hours. The temperature is then increased to 215°C and maintained there for 15 hours. The sample is then heated to 230°C for 7 hours to give a final product with an inherent viscosity of 0.60.

EXAMPLE 3

Preparation of Poly(Ethylene:4,4'-Isopropylidenediphenylene Terephthalate 20:80)

A. Prepolymer

A polymer is prepared by the process of Example 1, using the following quantities:
5.76 grams poly(ethylene terephthalate)
4.98 grams (0.03 mole) terephthalic acid
9.37 grams (0.03 mole) Bisphenol A diacetate
0.005 gram dibutyltin oxide
The mixture is reacted in a bath at 280°–300°C until a homogeneous melt is obtained. The following quantities of materials are then added to the melt:
14.94 grams (0.09 mole) terephthalic acid
28.12 grams (0.09 mole) Bisphenol A diacetate
The combined charge is allowed to react until a homogeneous mixture is again obtained. After a total heating period of 1 hour following the second addition, the mass solidifies and is isolated as an off-white solid with an inherent viscosity of 0.19.

B. Powder Build-up

The product from part A is placed in a test tube and heated at 245°–250°C under a vacuum of 0.1 millimeter for 15 hours. The solid is then isolated and has an inherent viscosity of 0.61.

EXAMPLE 4

Preparation of Poly(Ethylene:1,4-Phenylene Terephthalate 75:25)

A. Prepolymer

A polymer is prepared as in Example 1 using the following materials:
8.64 grams (0.045 mole) poly(ethylene terephthalate)
2.49 grams (0.015 mole) terephthalic acid
2.91 grams (0.015 mole) p-phenylene diacetate
0.005 gram dibutyltinoxide After the reaction has been run at 280°C for 1 hour, the melt is homogeneous. A vacuum of 0.02 mm is applied for one-half hour by which time the mass has solidified. The product is insoluble in phenol:chlorobenzene and in hexafluoro-isopropanol.

B. Powder Build-up

The solid from part A is placed in a test tube and heated at 235°–240°C under a vacuum of 0.1 millimeter. After three days heating the solid is isolated. The product is still insoluble in phenol:chlorobenzene and hexafluoro-isopropanol.

EXAMPLE 5

Preparation of Poly(Ethylene:1,3-Phenylene Terephthalate 75:25)

A. Prepolymer

A polymer is prepared as in Example 1, using the following materials:
8.64 grams (0.045 mole) poly(ethylene terephthalate)
2.49 grams (0.015 mole) terephthalic acid
2.91 grams (0.015 mole) m-phenylene diacetate
0.005 gram dibutyltin oxide After the reaction has continued at 280°C for 2 hours, a vacuum is applied to the homogeneous melt for 1 hour and then an amorphous product is isolated. It has an inherent viscosity of 0.34.

B. Crystallization

The product from part A is crystallized by placing the ground solid in acetone at room temperature. The crystallized material is then filtered and dried in an oven at 70°C overnight.

EXAMPLE 6

Preparation of Poly(1,4-Cyclohexylenedimethylene:1,4-Phenylene Terephthalate 75:25)

A. Prepolymer

A polymer is prepared as in Example 1 using the following materials:
12.33 grams (0.045 mole) poly(1,4-cyclohexylenedimethylene terephthalate)
2.49 grams (0.015 mole) terephthalic acid
2.91 grams (0.015 mole) p-phenylenediacetate
0.005 gram dibutyltinoxide The mixture is placed in a bath at 295°–300°C. After 1 hour and 50 minutes the material is pasty. A vacuum of 0.5 millimeter is applied to the paste with stirring for 15 minutes and the product is isolated as a crystalline solid which is insoluble in the solvents used for inherent viscosity determinations.

B. Powder Build-up

The product prepared in A is ground and placed in a test tube. The tube is placed in a bath at 230°–235°C. under a vacuum of 0.1 millimeter for 2 days. The temperature is then increased to 245°–255°C for 18 hours to give a final light tan solid which remains insoluble in the solvents used for viscosity determinations.

EXAMPLE 7

Preparation of Poly[Ethylene:4,4'-Isopropylidenediphenylene (50:50) 2,6-Naphthalenedicarboxylate:Terephthalate (50:50)]

A. Prepolymer

A polymer is prepared as in Example 1 using the following quantities:
7.26 grams (0.030 mole) poly(ethylene-2,6-naphthalenedicarboxylate)
4.98 grams (0.03 mole) terephthalic acid
9.37 grams (0.03 mole) Bisphenol A diacetate
0.005 gram dibutyltin oxide The mixture is placed in a bath at 285°C under a nitrogen blanket. With stirring it gradually becomes homogeneous. After 2 hours a vacuum is applied and maintained for 2 hours and 15 minutes. The product is an amber glass with an inherent viscosity of 0.41.

EXAMPLE 8

Preparation of Films

A sample of the polymer prepared in Example 1 (inherent viscosity - 0.93) is dissolved in chloroform to give a 20 percent solution. The thick dope is then coated onto a table maintained at 15°C. The coating is cured for 1 hour at 15°C, 2 hours at 20°C, 1 hour at 30°C, and finally 3 hours at 75°C. The resulting sheet is a clear colorless film 1.5 mils thick.

EXAMPLE 9

Preparation of A Photographic Product

The product of Example 8 is cut into a strip 6 × 1 × 0.0015 inch and treated with an activated gas by the process of Example IV of Belgian Pat. No. 736,993 using nitrogen trioxide as both the activator and reactive gases. The strip is then coated with a conventional gelatin silver halide photographic emulsion. The coating, after drying, has very good adhesion.

EXAMPLE 10

Preparation of Poly(Ethylene:4,4'-Isopropylidenediphenylene Terephthalate 50:50)

Into a 200 ml long-necked polymer flask are added the following:
38.4 grams (0.2 mole) poly(ethylene terephthalate)
33.2 grams (0.2 mole) terephthalic acid
62.4 grams (0.2 mole) Bisphenol A diacetate
0.05 gram dibutyltin oxide The flask is placed in a bath at 280°C and nitrogen is passed over the mixture while stirring. After 2 hours (T = 283°C) the mass is a clear, amber melt. A vacuum of 5 mm. is applied for 2½ hours while the distillate is collected in a dry ice-acetone trap. The product is a clear, amber glass with an inherent viscosity of 0.36.

The distillate is comprised of acetic acid, ethylene diacetate, and terephthalic acid.

The prepolymer is crystallized in acetone and heated at 210°–215°C/0.05 mm. as in Example 1 to give a final product having an inherent viscosity of 0.72 and containing 51 mole percent 4,4'-isopropylidenediphenylene units.

EXAMPLE 11

Preparation of Poly(Ethylene:4,4'-Isopropylidenediphenylene Terephthalate 25:75). A Highly Blocked Copolymer A polymer is prepared as in Example 1 using:

2.88 grams (0.015 mole) poly(ethylene terephthalate)
7.45 grams (0.045 mole) terephthalic acid
14.06 grams (0.045 mole) Bisphenol A diacetate After 4 hours at 240° to 280°C, the mass solidifies. Increasing the temperature to 320°C does not remelt the solid.

EXAMPLE 12

Preparation of Poly(Ethylene:4,4'-Isopropylidenediphenylene Terephthalate 20:80).

Into a 200 ml polymer flask are placed the following:

9.6 grams (0.05 mole) poly(ethylene terephthalate)
8.3 grams (0.05 mole) terephthalic acid
15.6 grams (0.05 mole) Bisphenol A diacetate The mixture is allowed to react at 280°C for 1½ hours with stirring and a nitrogen flush to give a clear amber melt. The temperature is then increased to 300°C whereupon the following are added:

24.9 grams (0.15 mole) terephthalic acid
46.8 grams (0.15 mole) Bisphenol A diacetate After an additional three-fourths hour the melt is again clear. A vacuum of 10 mm. is slowly applied at 315°C and maintained for one-half hour. The product is cooled under nitrogen to give an amber glass of inherent viscosity 0.28 and the following thermal properties:

$T_g = 168°C$ $T_{SCH} = 238°C$ $T_m = 340°C$ (range 317–357°C)

The pre-polymer thus prepared is ground and heated at 250°C/0.05 mm. for 63 hours. The final polymer has the following properties:

$\eta inh = 1.24$ $T_g = 204°C$ $T_m = 336°C$ (Range 301°–362°C)

EXAMPLE 13

Preparation of Poly(1,4-Cyclohexylenedimethylene:4,4'-Isopropylidenediphenylene Terephthalate 50:50)

A polymer is prepared by the three-step melt-solid process of Example 1 using:

8.22 g. (0.03 mole) poly(1,4-cyclohexylenedimethylene terephthalate)
4.98 g. (0.03 mole) terephthalic acid
9.37 g. (0.03 mole) Bisphenol A diacetate
0.005 g. dibutyltin oxide The product has the following properties:

$\eta inh = 0.52$ $T_g = 143°C$ $T_m = 275°C$ (Range 244–302°C)

EXAMPLE 14

Preparation of Poly(2,2-Dimethyl-1,3-trimethylene: 4,4'-Isopropylidenediphenylene Terephthalate 90:10)

A polymer is prepared by a one-step melt process using:

12.6 g. (0.054 mole) poly(2,2-dimethyl-1,3-trimethylene terephthalate)
1.0 g. (0.006 mole) terephthalic acid
1.9 g. (0.006 mole) Bisphenol A diacetate A flask containing the above mixture is placed in a bath at 265°C. While stirring and passing nitrogen over the melt, the temperature is increased to 280°C over a 2-hour period. By this time the reactant has formed a clear thick melt. A vacuum of 0.06 mm. is applied and maintained for 2 hours to give a product having the following properties:

$\eta inh = 0.53$ $T_g = 81°C$

EXAMPLE 15

Preparation of Poly(2,2,4,4-Tetramethyl-1,3-cyclobutylene: 4,4'-Isopropylidenediphenylene Terephthalate 75:25)

A polymer is prepared by the procedure of Example 1 using:

9.7 g. (0.0354 mole) poly(2,2,4,4-tetramethyl-1,3-cyclobutylene terephthalate)
1.96 g. (0.0118 mole) terephthalic acid
3.68 g. (0.0118 mole) Bisphenol A diacetate After increasing the molecular weight by heating in the solid phase, the product has an inherent viscosity of 0.38.

EXAMPLE 16

Preparation of Poly(1,3-Trimethylene:4,4'-Isopropylidenediphenylene Terephthalate 75:25)

A polymer is prepared by a melt process, as in Example 14, using:

9.27 g. (0.045 mole) poly(1,3-trimethylene terephthalate)
2.49 g. (0.015 mole) terephthalic acid
4.88 g. (0.015 mole) Bisphenol A diacetate The final product has an inherent viscosity of 0.37 and a $T_g$ of 79°C.

EXAMPLE 17

Preparation of Poly(1,6-Hexamethylene:4,4'-Isopropylidenediphenylene Terephthalate 75:25)

A polymer is prepared by a melt process, as in Example 14, using:

9.3 g. (0.0375 mole) poly(1,6-hexamethylene terephthalate)
2.1 g. (0.0125 mole) terephthalic acid
3.9 g. (0.0125 mole) Bisphenol A diacetate The final product has the following properties:

$\eta\text{inh} = 0.27$ $T_g = 27°C$ $T_{SCH} = 88°C$ $T_m = 124°C$ (Range 104–137°C)

EXAMPLE 18

Preparation of Poly(Ethylene:4,4'-Isopropylidenediphenylene Sebacate 50:50)

A polymer is prepared by a melt process, as in Example 14, using:
- 10.2 g. (0.0447 mole) poly(ethylene sebacate)
- 9.02 g. (0.0447 mole) sebacic acid
- 13.95 g. (0.0447 mole) Bisphenol A diacetate The final product is an amber, amorphous rubber having the following properties:

$\eta\text{inh} = 0.59$ $T_g = 19°C$

EXAMPLE 19

Preparation of Poly(Ethylene: 4,4'-Isopropylidenediphenylene Adipate 50:50)

A polymer is prepared by a melt process, as in Example 14, using:
- 5.16 g. (0.03 mole) poly(ethylene adipate)
- 4.38 g. (0.03 mole) adipic acid
- 9.36 g. (0.03 mole) Bisphenol A diacetate The final product is an amber rubber having the following properties:

$\eta\text{inh} = 0.14$ $T_g = 1°C$

EXAMPLE 20

Preparation of Poly(Ethylene:4,4'-Isopropylidendiphenylene Azelate 50:50)

A polymer is prepared by a melt process, as in Example 14, using:
- 6.4 g. (0.03 mole) poly(ethylene azelate)
- 5.6 g. (0.03 mole) azelaic acid
- 9.4 g. (0.03 mole) Bisphenol A diacetate The final product is a soft, tacky polymer having an inherent viscosity of 0.48.

EXAMPLE 21

Preparation of Poly(Ethylene:4,4'-Isopropylidenediphenylene Isophthalate 50:50)

A polymer is prepared by a melt process, as in Example 14, using:
- 4.8 g. (0.025 mole) poly(ethylene isophthalate)
- 4.15 g. (0.025 mole) isophthalic acid
- 7.8 g. (0.025 mole) Bisphenol A diacetate The final product is a glass having an inherent viscosity of 0.39.

EXAMPLE 22

Preparation of Film

A sample of a polymer prepared according to the procedure of Example 2 and having an inherent viscosity of 0.73 is formed into a clear amorphous sheet by melt-pressing at 255°C and 10 tons pressure for 5 minutes, and then quenching rapidly in cold water. The sheet is biaxially stretched 3X at 128.89°C and then incubated at 190°C for 5 minutes. The product has the following properties:

| | |
|---|---|
| Thickness | 1.9 mils |
| Yield Strength | 11,400 psi |
| Yield Elongation | 4.4 percent |
| Break Strength | 15,000 psi |
| Break Elongation | 29 percent |
| Young's Modulus | $4.2 \times 10^5$ psi |

EXAMPLE 23

This example demonstrates that polymers prepared by the process of this invention are structurally different from polymers of the same chemical composition prepared by prior art processes.

Poly(ethylene:4,4'-isopropylidenediphenylene terephthalate 50:50) is prepared by three different processes:

1. diphenyl terephthalate is reacted with ethylene glycol and Bisphenol A and the product is designated 23-a;
2. terephthaloyl chloride is reacted with ethylene glycol and Bisphenol A in pyridine and the product is designated 23-b; and
3. poly(ethylene terephthalate) is reacted with terephthalic acid and 4,4'-isopropylidenediphenol diacetate (Bisphenol A diacetate) according to the process of this invention and the product is designated 23-c.

First, the molecular weight heterogeneity of the three samples is determined by gel permeation chromatography and it is found that all three have the most probable molecular weight distribution ($M_w/M_n$) indicating no substantial difference among the three on this basis.

Next, the sequence heterogeneity is determined from nuclear magnetic resonance spectra according to the method described by Yamadera and Murano (Journal of Polymer Science, Vol. 5 (A-1), (1967) pp. 2259–2268. The results of these determinations are shown in TABLE 1 wherein $\eta\text{inh}$ is the inherent viscosity in 1:1 phenol-chlorobenzene, PEMW is the polystyrene equivalent molecular weight, BPA stands for Bisphenol A and B is a measure of the degree of randomness in the polymer and is defined as the sum of two probabilities: (1) the probability that an ethylene unit is followed by a bisphenol unit and (2) the probability that a bisphenol unit is followed by the ethylene unit, B = 1 for a random copolyester. If B<1, the units tend to cluster in blocks until in the extreme case, B = 0, the sample in question is a mixture of homopolymers. Similarly, where B>1, the sequence length is shorter, until finally, where B = 2, the sample in an alternating copolymer. See Yamadera et. al., supra, pp. 2265–2268. It is seen from the data of the Table that B is very nearly the same for all three samples, all three being only slightly of a block character, indicating no substantial difference in sequence heterogeneity.

TABLE 1

| Molecular Weight Heterogeneity | | | | | |
|---|---|---|---|---|---|
| Sample | $\eta\text{inh}$ | PEMW | $M_w/M_n$ | Mole % BPA | B |
| 23-a | 0.22 | 17,900 | 2.44 | 51 | 0.89 |
| 23-b | 0.73 | 64,100 | 2.32 | 49 | 0.80 |
| 23-c | 0.24 | 18,000 | 2.31 | 52 | 0.89 |

Finally, the chemical compositional heterogeneity is studied by a solvent fractionation technique wherein a sample of whole polymer is placed in a cup in a Soxhlet extractor and extracted by the succession of solvents listed in TABLE 2. The fractions are isolated by evaporation of the solvent and are characterized with respect to the variables listed. The results show significant differences in the composition of the samples. Solvents up to and including 1,2-dichloroethane dissolve 83 and 100 percent of samples 23-a and 23-b, respectively, but only 47 percent of sample 23-c dissolves. Likewise, sample 23-c is more soluble in a broader range of solvents, i.e., solvents having a broader range of solubility parameters, e.g., acetone and 1,3-dichloropropane as well as chloroform.

TABLE 2

Fractionation of Poly(ethylene:4,4'-isopropylidene diphenylene terephthalate 50:50) Prepared by Different Procedures

| | | $\eta$inh | Mole % BPZ | B | Wt % |
|---|---|---|---|---|---|
| 23-a | Whole | 0.72 | 46 | 0.9 | 100 |
| | Ether | — | — | — | 0 |
| | Acetone | — | 28 | 0.9 | 1 |
| | 1,2-Dichloropropane | 0.30 | 39 | 0.9 | 5 |
| | Tetrahydrofuran | 0.45 | 41 | 0.9 | 17 |
| | 1,2-Dichloroethane | 0.58 | 49 | 0.8 | 60 |
| | Dichloromethane | 0.72 | 51 | 0.8 | 18 |
| | Chloroform | 0.81 | 46 | 0.8 | 1 |
| 23-b | Whole | 0.73 | 48 | 0.8 | 100 |
| | Ether | — | — | — | 0.1 |
| | Acetone | — | 28 | 0.9 | 1 |
| | 1,2-Dichloropropane | 0.31 | 42 | 0.9 | 5 |
| | Tetrahydrofuran | 0.60 | 44 | 0.8 | 33 |
| | 1,2-Dichloroethane | 0.73 | 49 | 0.9 | 61 |
| 23-c | Whole | 0.55 | 50 | 0.8 | 100 |
| | Ether | — | — | — | 0.1 |
| | Acetone | 0.09 | 34 | 1.0 | 3 |
| | 1,2-Dichloropropane | 0.29 | 43 | 0.9 | 14 |
| | Tetrahydrofuran | 0.42 | 46 | 0.9 | 21 |
| | 1,2-Dichloroethane | 0.45 | 50 | 0.8 | 9 |
| | Dichloroethane | 0.60 | 51 | 0.8 | 39 |
| | Chloroform | 0.72 | 53 | 0.8 | 14 |

From these solubility data, it is concluded that sample 23-c, prepared by the process of this invention, is more heterogeneous with respect to composition than samples 23-a and 23-b, prepared by prior art processes.

In support of this conclusion, it is also found that polymer samples prepared by the process of this invention (TABLE 3, samples 23-c-1, 23-c-2 and 23-c-3) have a higher degree of crystallinity, as determined by X-ray diffraction patterns, than do polymer samples prepared by the prior art processes. In each case, treatment of the ground prepolymers with acetone causes crystallization, but the samples prepared by the process of the present invention crystallize faster and to a greater extent than the others. This is attributable to the presence of material high in mole percent of polymerized Bisphenol A which can crystallize quickly and provide sites for further crystallization.

TABLE 3

| Sample | Comparative Crystallinity Data | | |
|---|---|---|---|
| | $\eta$inh | Mole % BPA | % Crystallinity |
| 23-a-1 | 0.29 | 49 | 27 |
| 23-a-2 | 0.33 | 49 | 27 |
| 23-a-3 | 0.28 | 50 | 28 |
| 28-b | 0.57 | 52 | 17 |
| 23-c-1 | 0.23 | 53 | 33 |
| 23-c-2 | 0.33 | 52 | 33 |
| 23-c-3 | 0.39 | 53 | 32 |

EXAMPLES 24 – 76

The process of this invention is employed to prepare 53 different polyesters. The results are shown in TABLE 4. The two embodiments of the process that are used are designated "M" and "MS" in the Table. "M" stands for "melt" and corresponds to the process employed in Example 3 above, while "MS" stands for "melt-solid" and corresponds to the process as set forth in Example 1. Where the designation

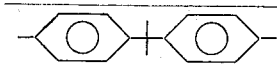

is employed in the Table, the structure

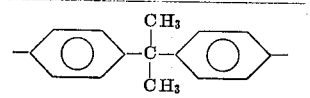

is intended. Other notations used will be understood by those skilled in the art.

TABLE 4.—POLYESTERS OF ALIPHATIC AND AROMATIC GLYCOLS $$\left[\left(\begin{matrix}O\\\|\\C\end{matrix}-R_1-\begin{matrix}O\\\|\\C\end{matrix}-O-R_2-O\right)_y\left(\begin{matrix}O\\\|\\C\end{matrix}-R_3-\begin{matrix}O\\\|\\C\end{matrix}-O-Ar-O\right)_z\right]$$

| Example | $R_1$ | $R_2$ | y | $R_3$ | Ar | z | $\eta$inh | Process |
|---|---|---|---|---|---|---|---|---|
| 24 | —⟨O⟩— | —CH₂CH₂— | 0.95 | —⟨O⟩— | —⟨O⟩—⟨O⟩— | 0.05 | 0.52 | MS |
| 25 | Same as above | —CH₂CH₂— | 0.90 | Same as above | Same as above | 0.10 | 0.60 | MS |
| 26 | do | —CH₂CH₂— | 0.75 | do | do | 0.25 | 0.38 | M |
| 27 | do | —CH₂CH₂— | 0.65 | do | do | 0.35 | 0.56 | M |
| 28 | do | —CH₂CH₂— | 0.50 | do | do | 0.50 | 0.93 | MS |
| 29 | do | —CH₂CH₂— | 0.35 | do | do | 0.65 | 1.43 | MS |
| 30 | do | —CH₂CH₂— | 0.20 | do | do | 0.80 | 0.61 | MS |
| 31 | do | —CH₂CH₂— | 0.90 | do | —⟨O⟩— | 0.10 | 0.51 | MS |
| 32 | do | —CH₂CH₂— | 0.75 | do | Same as above | 0.25 | Insol. | MS |
| 33 | do | —CH₂CH₂— | 0.50 | do | do | 0.50 | Insol. | MS |
| 34 | do | —CH₂CH₂— | 0.90 | do | —⟨O⟩— | 0.10 | ——— | MS |
| 35 | do | —CH₂CH₂— | 0.75 | do | Same as above | 0.25 | 0.34 | M |

TABLE 4.—POLYESTERS OF ALIPHATIC AND AROMATIC GLYCOLS—Continued

| Example | $R_1$ | $R_2$ | $y$ | $R_3$ | Ar | $Z$ | $\eta_{inh}$ | Process |
|---|---|---|---|---|---|---|---|---|
| 36 | do | $-CH_2-\langle S \rangle-CH_2-$ | 0.75 | do | $\langle O \rangle$ | 0.25 | Insol. | MS |
| 37 | do | Same as above | 0.50 | do | $\langle O \rangle-\langle O \rangle$ | 0.50 | 0.40 | MS |
| 38 | $\langle O \rangle\langle O \rangle$ (biphenyl) | $-CH_2CH_2-$ | 0.50 | do | Same as above | 0.50 | 0.41 | M |
| 39 | $\langle O \rangle$ | $-CH_2CH_2-$ | 0.60 | do | do | 0.40 | 0.53 | M |
| 40 | Same as above | $-CH_2CH_2-$ | 0.95 | do | $\langle O \rangle$ | 0.05 | 0.81 | MS |
| 41 | do | $-CH_2CH_2-$ | 0.85 | do | Same as above | 0.15 | 0.80 | MS |
| 42 | do | $-CH_2CH_2-$ | 0.80 | do | do | 0.20 | 0.51 | MS |
| 43 | do | $-CH_2CH_2-$ | 0.65 | do | do | 0.35 | | MS |
| 44 | do | $-CH_2-\langle S \rangle-CH_2-$ | 0.95 | do | do | 0.05 | 0.37 | MS |
| 45 | do | Same as above | 0.90 | do | do | 0.10 | 0.30 | MS |
| 46 | do | do | 0.85 | do | do | 0.15 | 0.32 | MS |
| 47 | do | do | 0.95 | do | $\langle O \rangle-\langle O \rangle$ | 0.05 | 0.24 | MS |
| 48 | do | do | 0.90 | do | Same as above | 0.10 | 0.58 | MS |
| 49 | do | $-CH_2-C(CH_3)_2-CH_2-$ | 0.90 | do | do | 0.10 | 0.53 | M |
| 50 | do | $\times$ | 0.75 | do | do | 0.25 | 0.38 | MS |
| 51 | do | $(CH_2)_6$ | 0.90 | do | do | 0.10 | 0.26 | M |
| 52 | do | $(CH_2)_6$ | 0.75 | do | do | 0.25 | 0.27 | M |
| 53 | do | $(CH_2)_6$ | 0.60 | do | do | 0.40 | 0.61 | MS |
| 54 | do | $(CH_2)_6$ | 0.50 | do | do | 0.50 | 0.50 | MS |
| 55 | do | $(CH_2)_3$ | 0.90 | do | do | 0.10 | 0.40 | MS |
| 56 | do | $(CH_2)_3$ | 0.75 | do | do | 0.25 | 0.37 | M |
| 57 | do | $(CH_2)_3$ | 0.50 | do | do | 0.50 | 0.80 | MS |
| 58 | $\langle O \rangle$ | $(CH_2)_2$ | 0.90 | | do | 0.10 | 0.42 | M |
| 59 | Same as above | $(CH_2)_2$ | 0.65 | Same as above | do | 0.35 | 0.42 | M |
| 60 | do | $(CH_2)_2$ | 0.50 | do | do | 0.50 | 0.39 | M |
| 61 | do | $(CH_2)_2$ | 0.35 | do | do | 0.65 | 0.49 | M |
| 62 | do | $(CH_2)_2$ | 0.20 | do | do | 0.80 | 0.40 | M |
| 63 | $(CH_2)_4$ | $(CH_2)_2$ | 0.50 | $(CH_2)_4$ | do | 0.50 | 0.14 | M |
| 64 | $(CH_2)_7$ | $(CH_2)_2$ | 0.90 | $(CH_2)_7$ | do | 0.10 | 0.42 | M |
| 65 | $(CH_2)_7$ | $(CH_2)_2$ | 0.75 | $(CH_2)_7$ | do | 0.25 | 0.41 | M |
| 66 | $(CH_2)_7$ | $(CH_2)_2$ | 0.50 | $(CH_2)_7$ | do | 0.50 | 0.48 | M |
| 67 | $(CH_2)_7$ | $(CH_2)_2$ | 0.25 | $(CH_2)_7$ | do | 0.75 | 0.51 | M |
| 68 | $(CH_2)_8$ | $(CH_2)_2$ | 0.90 | $(CH_2)_8$ | do | 0.10 | 0.79 | M |
| 69 | $(CH_2)_8$ | $(CH_2)_2$ | 0.75 | $(CH_2)_8$ | do | 0.25 | 0.41 | M |
| 70 | $(CH_2)_8$ | $(CH_2)_2$ | 0.60 | $(CH_2)_8$ | do | 0.40 | 0.59 | M |
| 71 | $(CH_2)_8$ | $(CH_2)_2$ | 0.50 | $(CH_2)_8$ | do | 0.50 | 0.59 | M |
| 72 | $(CH_2)_8$ | $(CH_2)_2$ | 0.40 | $(CH_2)_8$ | do | 0.60 | 0.84 | M |
| 73 | $(CH_2)_8$ | $(CH_2)_2$ | 0.25 | $(CH_2)_8$ | do | 0.75 | 0.76 | M |
| 74 | $(CH_2)_8$ | $(CH_2)_2$ | 0.10 | $(CH_2)_8$ | do | 0.90 | 0.66 | M |
| 75 | $\langle O \rangle$ | $(CH_2)_2$ | 0.50 | | $\langle O \rangle-\langle O \rangle$ | 0.50 | 0.37 | M |
| 76 | Same as above | $(CH_2)_2$ | 0.25 | Same as above | Same as above | 0.75 | 0.52 | M |

Pat. No.: 3,816,122    Folio 131

Generally, the materials of this invention can be solvent-cast or melt-extruded into sheets or films useful as flexible supports which can be employed in various layer arrangements and structural combinations. Generally, the flexible supports of this invention are treated by any convenient method to improve the adhesion of superimposed coatings or layers. Useful procedures include sub-coating with either aqueous subbing systems, such as latexes or with organic subbing systems comprising solvent-soluble polymers in aqueous or organic solvents or in solvent mixtures, contacting with a chemical agent, such as sulfuric acid, electron bombardment and the like.

Films prepared from the polymers of this invention are useful as flexible supports for photographic silver halide emulsions and other light-sensitive systems that do not contain silver halides. Polymeric films, according to this invention, are also desirable as supports for multilayer elements used in color photography and in diffusion transfer processes.

Film supports prepared from polymers of this invention are compatible with a wide variety of materials employed as binding agents in photographic silver halide emulsions. Useful binding agents include gelatin, synthetic polymeric compounds, such as dispersed vinyl compounds, such as in latex form and mixtures of gelatin and other synthetic polymeric compounds. These polymers find further use as supports for light-sensitive colloid layers such as are used in image transfer processes, in lithography, and the like. The dimensional stability of the subject polymers make them suitable as supports for photoresists such as those utilized in the preparation of printed circuits, and the like.

A combination of a poly(vinyl acetal) with the polyesters described herein are suitable in photothermographic materials as binders. This combination of binders provides extended processing latitude for photothermographic materials. Poly(vinyl acetals) which are suitable in this combination can contain recurring units represented by the structure:

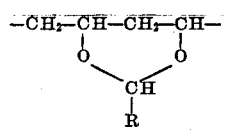

wherein R is hydrogen or alkyl containing 1 to 11 carbon atoms, such as methyl, ethyl, propyl, butyl, isobutyl, pentyl, neopentyl, octyl, nonyl, decyl, undecyl and the like. The poly(vinyl acetals) can contain about 15 to 60 and typically about 25 to about 50 mole percent of recurring structural units represented by the structure:

and 0 to 5 mole percent of recurring units represented by the structure

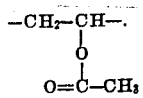

The molecular weight of the poly(vinyl acetals) can be about 20,000 to about 400,000 but typically about 30,000 to about 270,000. Poly(vinyl acetals) which are useful are described, for example, in C. E. Schidknecht "Vinyl and Related Polymers," pages 358–365, John Wiley and Sons Incorporated, New York, N.Y. Other polyesters which are useful in combination with the described poly(vinyl acetals) in photothermographic materials are typically those derived from 15 to 90, preferably 15 to 60, mole percent of an aromatic diol such as resorcinol, hydroquinone and bisphenols such as described in U.S. Pat. No. 3,189,662 of Howard A. Vaughn issued June 15, 1965 and described in U.S. application Ser. No. 141,445 of Wilson and Hamb, filed May 7, 1971; about 10 to about 85, typically about 40 to about 85, mole percent of an aliphatic diol having about two to 10 carbon atoms such as ethylene glycol, 1,3-propane diol, propylene glycol, tetramethylene glycol, 1,5-pentane diol, neopentyl glycol, 1,6-hexane diol, octamethylene glycol, 1,10-decane diol, 1,4-cyclohexane diol, 1,4-cyclohexane dimethanol, diethylene glycol, triethylene glycol, tetraethylene glycol, dipropylene glycol, 1,2-butanediol, 1,3-butanediol, and the like preferably ethylene glycol; and 100 mole percent of an aromatic dicarboxylic acid or a mixture of aromatic dicarboxylic acids such as phthalic acid, isophthalic acid and terephthalic acid, preferably terephthalic acid. Derivatives of these glycols and acids can be used in preparing the polyesters. For example, the diacetates of glycols can be used in place of the diols polyesterification reactions, or anhydrides, acid chlorides, lower alkyl esters, phenyl esters and the like can be used in the place of the acids for incorporation into the desired polyester. When Bisphenol A is employed, it is preferred to use no more than about 60 mole percent of the total diol concentration. When lower molecular weight aromatic diols such as resorcinol are used, the concentration of such diols can be as high as 90 mole percent of the total diol concentration. An especially useful combination of poly(vinyl acetal) with a polyester in photothermographic materials is the combination of poly(vinyl butyral) with poly(ethylene-4,4'-isopropylidenediphenylene terephthalate).

The desired combination of poly(vinyl acetals) with polyesters in photothermographic materials can be used in combination with other binders such as described in U.S. Pat. No. 3,457,075 of David A. Morgan, issued July 22, 1969 and described in Belgian Pat. No. 766,589 issued June 15, 1971. Typical photothermographic materials in which the described combination of binders can be employed are also described in these patents.

A typical photothermographic material in which the described combination of binders can be employed comprises a heavy metal salt oxidizing agent, such as silver behenate, with an organic reducing agent, and a photosensitive component, such as photosensitive silver halide. The following example illustrates such a photothermographic material:

EXAMPLE 77

A photothermographic element is prepared as follows:

A coating composition is prepared by mixing the following components:

| | |
|---|---|
| Silver behenate | 168 g |
| Behenic acid | 128 g |
| Poly(vinyl butyral) | 120 g |
| Phthalimide | 34 g |
| Poly(ethylene: 4,4'-isopropylidene-diphenylene terephthalate) | 24 g |
| Acetone-toluene (1:1 volume) | 1600 ml |

After ball-milling for 72 hours the following solutions are combined with the resulting dispersion with stirring:

| | |
|---|---|
| Acetone-toluene (1:1 volume) | 400 ml |
| Acetone containing 1% by weight Lithium bromide (which reacts with the silver behenate to form silver bromide) | 300 ml |

After stirring for several minutes, 71 milliliters of the resulting dispersion is combined with the following solutions:

| | |
|---|---|
| Acetone containing 0.1% by weight 3-Carboxymethyl-5-[(3-methyl-2(3H)-thiazolinylidene)isopropylidene] rhodanine | 2.0 ml |
| Acetone containing 10% by weight 2,2'-dihydroxy-1,1'-binaphthyl | 16.5 ml |
| Acetone containing 10% by weight 2,4-dihydroxybenzophenone | 2.5 ml |
| Acetone containing 1% by weight 5-acetyl-2-benzyloxycarbonylthio-4-methylthiazole | 8.0 ml |
| Acetone-toluene (1:1 by volume) | 25.0 ml |

The composition is mixed thoroughly, coated at 6 grams of the resulting composition/ft² on a polyethylene coated paper support and dried to provide a photothermographic element containing about 60 milligrams of silver/ft², about 180 milligrams of poly(vinyl butyral)/ft² and about 10 milligrams of poly(ethylene:-4,4'-isopropylidenediphenylene terephthalate/ft² of support.

This photothermographic element is sensitometrically exposed to tungsten light for 1 second. The resulting image is developed by overall heating by holding the side opposite the photosensitive layer in contact with a heated metal block for 4 seconds at temperatures ranging from 135° to 170°C at 5°C intervals. The photothermographic element provides an image having a maximum reflection density of 1.34 with a gamma of 0.92 at 160°C.

In photothermographic materials the described poly(vinyl acetal) binders are suitable at coverages of about 40 milligrams/ft² to about 360 milligrams/ft² of support, typically about 80 milligrams/ft² to about 200 milligrams/ft² of support. Polyesters, such as poly(ethylene: 4,4'-isopropylidenediphenylene terephthalate), in this combination are suitable at coverages of about 5 milligrams/ft² to about 100 milligrams/ft² of support, typically about 20 milligrams/ft² to about 70 milligrams/ft² of support.

In preparing photothermographic materials containing the described combination of polyesters with poly(vinyl acetals) the polyesters and/or poly(vinyl acetals) can be mixed with the coating composition at any stage during preparation of the photothermographic materials.

The invention has been described in detail with particular reference to preferred embodiments thereof, but it will be understood that variations and modifications can be effected within the spirit and scope of the invention.

What is claimed is:

1. A photographic element comprising a support and at least one light sensitive layer wherein the support comprises a film-forming polyester prepared by A. mixing:
 1. a first polyester having the structure:

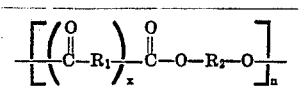

wherein $R_1$ is an aliphatic radical, an alicyclic radical or an aromatic radical, $R_2$ is an aliphatic radical or an alicyclic radical, $x$ is 0 or 1 and $n$ is a positive integer, 2. a dicarboxylic acid having the structure:

wherein $R_3$ is an aliphatic radical, an alicyclic radical or an aromatic radical, and 3. an aromatic diester having the structure:

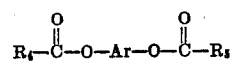

wherein $R_4$ and $R_5$ are radicals independently selected from the group consisting of alkyl radicals, cycloalkyl radicals, and aryl radicals and Ar is an arylene radical;

B. heating the mixture to form a melt; and
C. removing the non-polymeric by-products of the reaction whereby the reaction equilibrium is driven in the direction of polymer formation and said second polyester is obtained.

2. The photographic element of claim 1 wherein the process of preparing the polyester further comprises the steps of crystallizing and reheating the polymeric product obtained after step (C).

3. A photographic element comprising a support and at least one light sensitive layer wherein the support comprises a film-forming polyester prepared by A. mixing:
 1. a first polyester having the structure:

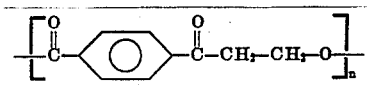

wherein $n$ is a positive integer;

2. terephthalic acid, and
 3. an aromatic diester having the structure:

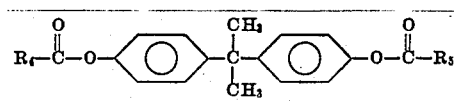

wherein $R_4$ and $R_5$ are independently selected alkyl radicals;

B. heating the mixture to form a melt; and

C. removing by-products by vacuum distillation, whereby a second polyester is obtained.

4. The photographic element of claim 3 wherein the process of preparing the polyester further comprises the steps of crystallizing and reheating the polymeric product obtained after step (C).

5. A photothermographic element comprising a combination of poly(vinyl acetal) and a film-forming polyester prepared by A. mixing:

1. a first polyester having the structure:

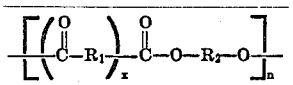

wherein $R_1$ is an aliphatic radical, an alicyclic radical or an aromatic radical, $R_2$ is an aliphatic radical or an alicyclic radical, $x$ is 0 or 1 and $n$ is a positive integer, 2. a dicarboxylic acid having the structure:

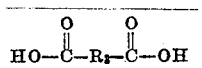

wherein $R_3$ is an aliphatic radical, an alicyclic radical or an aromatic radical, and 3. an aromatic diester having the structure:

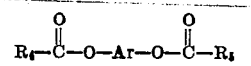

wherein $R_4$ and $R_5$ are radicals independently selected from the group consisting of alkyl radicals, cycloalkyl radicals, and aryl radicals and Ar is an arylene radical;

B. heating the mixture to form a melt; and

C. removing the non-polymeric by-products of the reaction whereby the reaction equilibrium is driven in the direction of polymer formation and said second polyester is obtained.

6. The photothermographic element of claim 5 comprising a heavy metal salt oxidizing agent, an organic reducing agent and a photosensitive component.

7. The photothermographic element of claim 6 wherein the metal salt oxidizing agent is silver behenate.

8. The photothermographic element of claim 6 wherein the photosensitive component is silver halide.

9. The photothermographic element of claim 5 wherein the poly(vinyl acetal) is poly(vinyl butyral).

* * * * *

PO-1050
(5/69)

UNITED STATES PATENT OFFICE
CERTIFICATE OF CORRECTION

Patent No. 3,816,122        Dated June 11, 1974

Inventor(s) Frederick L. Hamb

It is certified that error appears in the above-identified patent and that said Letters Patent are hereby corrected as shown below:

Column 2, that part of the first formula reading:

" $-R_2-O\}_n +$ " should read -- $-R_2-O\}_n$ --.

Column 2, last line, the following should be inserted before the part of the equation beginning "HO$_2$" etc.

$$-- \left[(\overset{O}{\overset{\|}{C}}-R_1)_{\overline{x}}\overset{O}{\overset{\|}{C}}-O-R_2-O\right]_{\overline{n}} + --.$$

Column 4, line 37, after the word spirobi, -- [chroman] -- should be inserted.

Column 4, line 64, after "2-", -- [2,3,4,5-tetrahydro-2,2-dimethyl-4-oxofur-3-yl] -- should be inserted.

Column 5, line 6, "(4hydroxy-" should read -- 4-hydroxy- --.

Column 5, line 22, "tolymethane" should read --tolylmethane--.

Column 14, line 50, "sample in" should read --sample is--.

Column 15, Table 2, the second heading under "Mole %", "BPZ" should read --BPA--.

Signed and sealed this 13th day of May 1975.

(SEAL)
Attest:

RUTH C. MASON
Attesting Officer

C. MARSHALL DANN
Commissioner of Patents
and Trademarks